Sept. 5, 1967 R. A. LOUKS 3,339,760
GRAIN BIN LEVEL FILLER
Filed Oct. 24, 1965 2 Sheets-Sheet 2
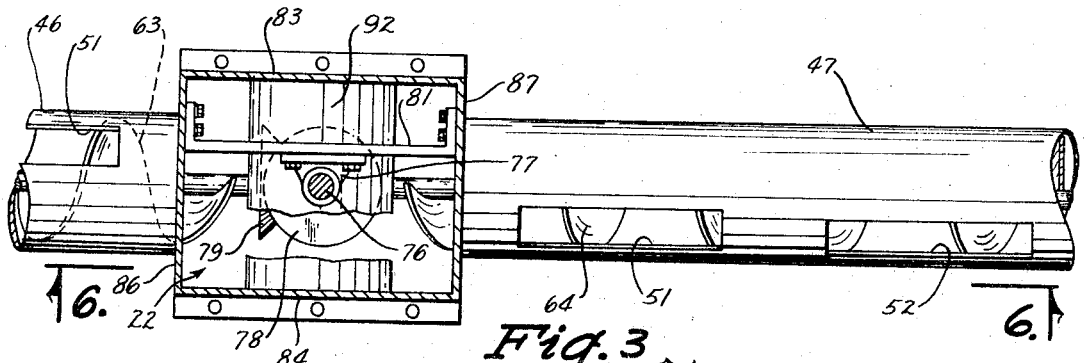
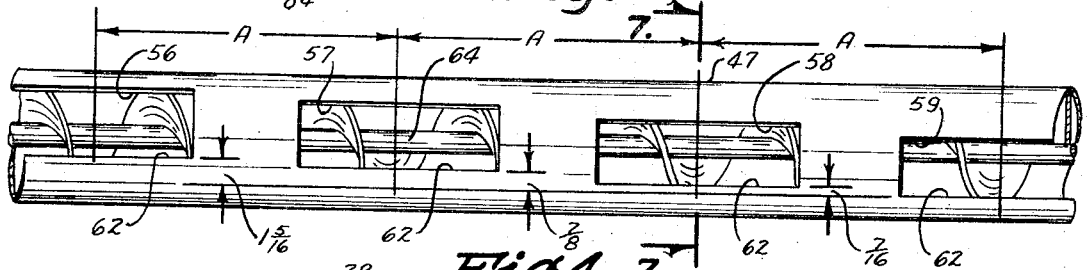
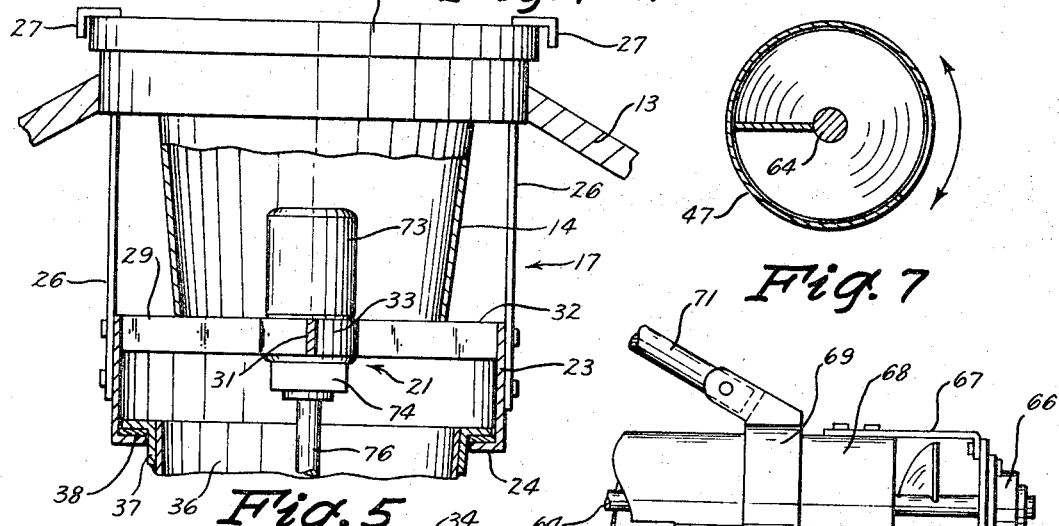
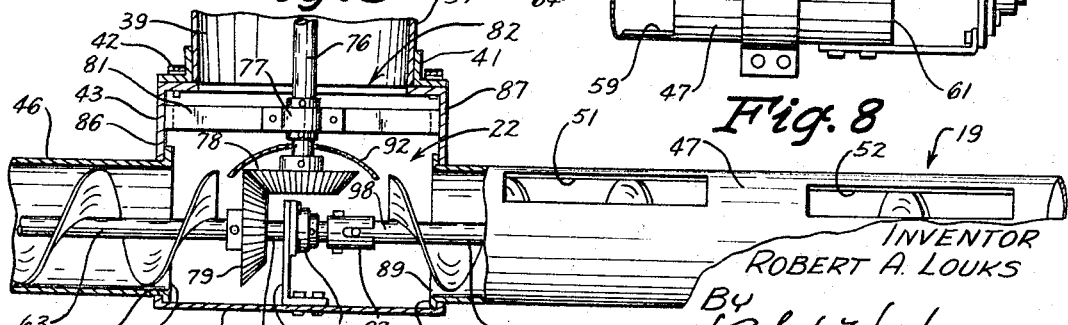
INVENTOR
ROBERT A. LOUKS
BY
ATTORNEY United States Patent Office 3,339,760
Patented Sept. 5, 1967

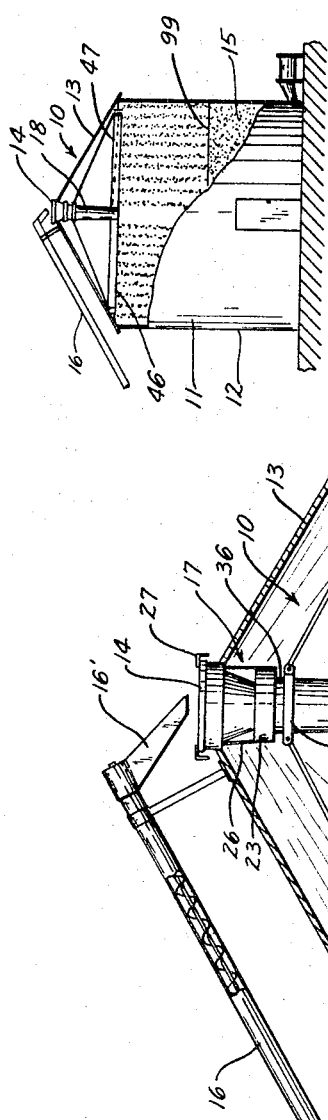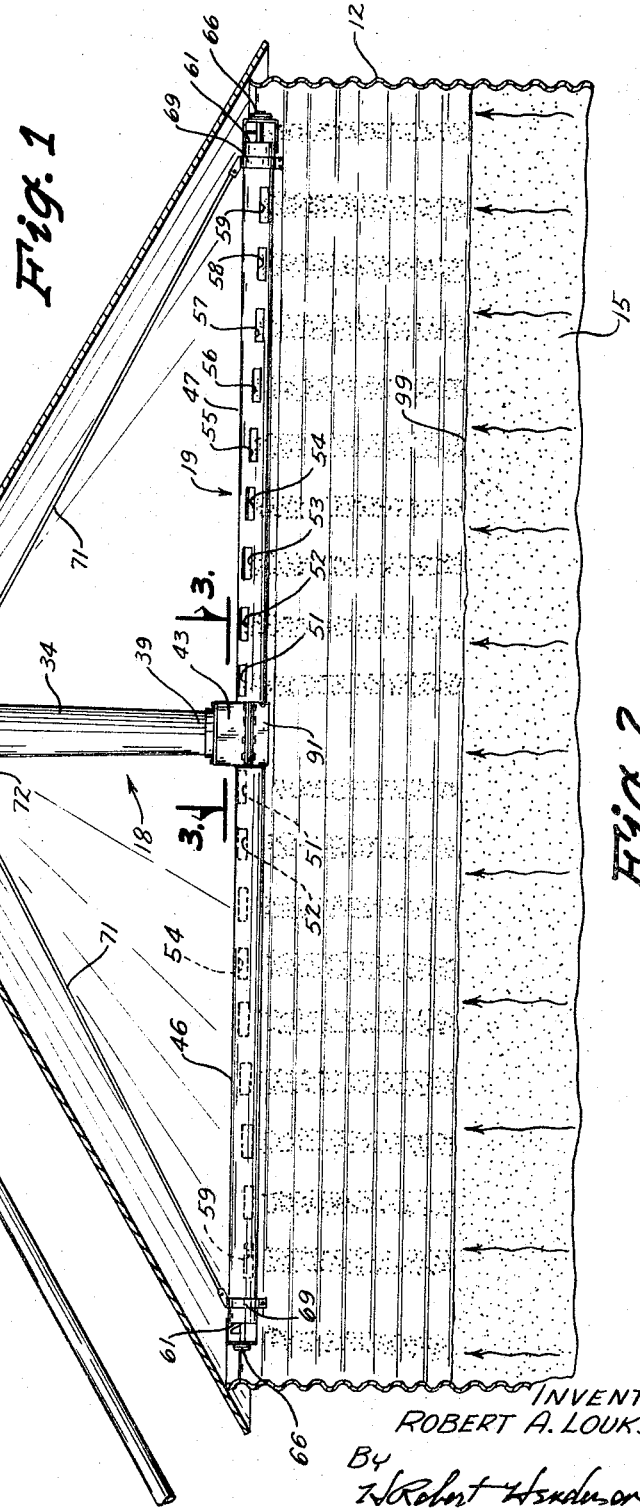

3,339,760
GRAIN BIN LEVEL FILLER
Robert A. Louks, Gilman, Iowa 50106
Filed Oct. 24, 1965, Ser. No. 504,469
3 Claims. (Cl. 214—17)

This invention relates generally to the storing of granular material, and more particularly to the discharging of granular material into a grain bin such that the surface of the material is continually maintained level.

Normally, grain is discharged into a grain bin through a central opening formed in the roof thereof. To prevent uneven piling of the material for what are now obvious reasons, many spreading and leveling devices have been devises and used. Some devices laterally throw the grain in a circular spreading manner by a fanning action, whereas other devices propose a sloping, rotating tube with holes in bottom thereof by which grain is discharged primarily by gravity through the holes as the tube is rotated through a 360° circle. The latter arrangement also depends upon a friction drive at the outer end of the tube which coacts with a rail or like member secured to the wall of the grain bin completely about its periphery.

To eliminate the disadvantageous fanning action, to eliminate the dependency in any degree of discharge upon gravity with its attendant disadvantages of uneven discharge due to humidity, etc., and to eliminate the need for friction drive of the discharging apparatus, while providing a constant level filling of a grain bin irregardless of temperature and humidity conditions, it is an object of this invention.

Another object of this invention is the provision of a new and novel apparatus for discharging granular material into a grain bin while maintaining the surface of the material level at all times during the discharging.

Another object of this invention is to provide an apparatus for discharging granular material in a level manner, wherein the material is moved radially in opposite directions from the bottom of a hopper structure suspended from the roof of the grain bin.

Yet another object of this invention is to provide an apparatus for discharging granular material in a level fill manner, wherein the material is discharged into a tubular auger device extended diametrically across a grain bin, with the material being moved radially in opposite directions for discharge therefrom while the tube rotates, and whereas the tube need rotate only through a 180° arc to completely sweep the grain bin.

Still another object of this invention is to provide an apparatus for discharging granular material as designated hereinbefore, and wherein the source of power for imparting motion to the auger within the discharge tube is mounted within the suspended hopper, and depending therefrom for operative connection to the auger at a point intermediate the ends thereof, such that the operative connection between the source of power and the auger provides for rotation of the entire discharge device in a circular manner about the grain bin.

Another object of this invention is the provision of an apparatus capable of accomplishing the above designated objectives which is simplified, economical of manufacture, effective in use, and easily serviced.

These objects, and other features and advantages of this invention will become readily apparent upon reference to the following description, when taken in consideration with the accompanying drawings, wherein:

FIG. 1 is a reduced elevational view of a conventional grain bin within which a preferred embodiment of this invention is mounted, the bin being partly broken away to show the invention as assembled therewith;

FIG. 2 is an enlarged, fragmentary sectional view of the grain bin of FIG. 1, showing the material discharging and level filling apparatus of this invention in side elevation;

FIG. 3 is an enlarged, horizontal sectional view taken along the line 3—3 in FIG. 2, with certain parts broken away and others shown by dotted lines for clarity of illustration;

FIG. 4 is a fragmentary side elevational view of the discharge auger device of this invention;

FIG. 5 is a fragmentary, detail vertical sectional view of the upper portion of the apparatus of this invention as suspended from the roof of the grain bin;

FIG. 6 is a fragmentary, detail vertical sectional view as taken along the line 6—6 in FIG. 3;

FIG. 7 is a sectional view taken along the line 7—7 in FIG. 4; and

FIG. 8 is a fragmentary, elevational view of one end of the discharge device of this invention.

Referring now to the drawings, the apparatus for discharging and level filling granular material of this invention is indicated generally at 10 in FIG. 1, and is shown in assembled condition within a conventional grain storage bin 11.

The grain bin 11 includes the usual circular corrugated wall 12 supported on a perforated floor structure (not shown) and covered by a conical roof 13 at the apex of which a circular funnel 14 is secured. When not in use, a lid (not shown) is provided to securely cover the funnel 14; and when in use, as for example when being filled with grain 15, a conventional elevator auger unit 16 is provided, the upper spout 16' being positionable over the funnel 14 for discharging grain therein.

The apparatus 10 of this invention comprises generally a suspension unit 17 (FIG. 2) for suspended securement to the roof 13 about the funnel 14 for rotatably supporting a hopper unit 18 which receives and holds grain discharged through the funnel 14; a hopper unit 18 operable to discharge the grain in a level fill manner into the bin 11, and operatively connected to the bottom of the hopper unit 18; and a power unit 21 mounted within the confines of the funnel 14 and the suspension unit 17 and including a gear transfer assembly 22 at the lower end of the hopper unit 18 for operatively powering the discharge unit 19.

The suspension unit 17 specifically comprises a circular collar 23 (FIG. 5) having an inwardly extended, horizontally disposed flange 24 at its lower end. The collar is suspended in a horizontally disposed condition as best illustrated in FIG. 2 by means of a plurality of strap hangers 26, the upper ends 27 of which hook over the upper edge 28 of the funnel 14. The lower ends of the strap hangers 26 are secured, as by bolts or the like, to the collar 23. Internally of the collar 23, a smaller collar 33 is supported in a concentric position therewith as best illustrated in FIG. 5, by a quartet of support arms (only three showing) 29, 31, and 32. The purpose for the collar 33 will be described more in detail hereinafter.

The hopper unit 18 comprises an elongated, vertically disposed hopper enclosure 34 of a tubular nature, the upper end 36 (FIG. 5) of which is strengthened by a circular, right angular member 37 adapted to ride upon a bushing 38 mounted on the flange 24 of the suspension collar 23. The lower end 39 (FIG. 6) of the hopper enclosure 34 is also strengthened by a circular, right angular member 41 secured as by bolts 42 to the top surface of an intermediate housing 43 of the discharge unit 19. By this arrangement, the hopper enclosure 34 is rotatable within the suspension unit 17 about a vertical axis, which axis is a longitudinal axis of the hopper enclosure 34.

The discharge unit 19 comprises specifically a pair of elongated tubes 46 and 47 interconnected at their inner ends 48 and 49, respectively (FIG. 6), by the housing 43, forming thereby a continuous tube of a length sufficient to stretch substantially across the entire diameter of the grain bin 11 (see FIG. 2); the diameter of each tube 46 and 47, in the present embodiment, is four inches. Formed within a side wall of each tube 46 and 47 are a plurality of rectangular openings 51, 52, 53, 54, 55, 56, 57, 58, and 59 (FIG. 2) which form material discharge openings along one side of each tube, and with another material discharge opening in the form of the open end 61 of each tube 46 and 47. Each of the discharge openings is two inches in peripheral length and six inches in longitudinal length relative to the periphery and longitudinal axis of each tube. The longitudinal spacing from one discharge opening to the next adjacent discharge opening, as measured along the longitudinal axis of each tube from the centers of the openings is approximately one foot, as indicated by the letter A in FIG. 4. It is also noted that the distance from the center of the intermediate housing 43, which is on the vertical axis of the hopper enclosure 34, to the center of the first opening 51 in each tube 46 and 47 is one foot, and the distance from the center of the outermost opening 59 in each tube to the end 61 thereof is also approximately one foot.

Beginning with the discharge opening 51 nearest the intermediate housing 43, for each tube 46 and 47, each discharge opening next adjacent thereto toward the outer end 61 of the respective tube, is formed lower in the side wall of the tube. Thus, as best viewed in FIG. 2, it is seen that a progressive lowering of the discharge openings occurs from both inner ends of the tubes 46 and 47 to the outer ends thereof.

Referring particularly to FIG. 4, it is clearly shown that the peripheral distance between the lower wall portion 62 of each discharge opening relative to the lower wall portion 62 of the next adjacent, outward discharge opening is approximately 7/16 of an inch. Thus, the progressive lowering of the discharge openings is in equal increments from the innermost discharge opening 51 to the outermost thereof 59.

Within each tube 46 and 47, an elongated auger 63 and 64, respectively, is rotatably mounted. Although the augers 63 and 64 both have the same direction of flighting as one looks from the innermost end to the outermost end thereof, as the augers are disposed radially in opposite directions, their flighting is reversed such that the grain dumped from the hopper enclosure 34 to the innermost ends of the tubes 46 and 47 is transmitted radially outwardly in opposite directions within the tubes by virtue of the augers 63 and 64.

The outer end of each auger is journaled in a bearing mounting 66 (FIG. 8) supported in spaced relation outwardly from the outer end 61 of each tube by an open bracket 67. It is also noted that each outer end of each tube 46 and 47 is supported by a collar 69 and a strut 71, the upper end of each strut being secured to another collar 72 (FIG. 2) mounted adjacent the upper end of the hopper enclosure 34.

The power unit 21 for rotating the two augers 63 and 64 comprises an electrically operated motor 73 and gear reduction unit 74 (FIG. 5) both of which are supported by the collar 33 and arms therefor within the funnel 14, and also within the confines of the suspension unit collar 23. An output drive shaft 76 (FIG. 5) from the gear reduction unit 74 depends vertically and downwardly along the longitudinal axis of the hopper enclosure 34, with its lower end journaled in a bearing mounting 77 (FIGS. 3 and 6), and to which is secured the uppermost of a pair of bevel gears 78 and 79. The bearing mounting 77 is supported across the upper area of the enclosed housing 43 by a support arm 81.

Referring to FIGS. 3 and 6, the housing 43 has an opening 82 (FIG. 6) formed in the upper end thereof and aligned with the lower open end 39 of the hopper enclosure 34 to receive grain therethrough. The housing 43 is completed by a pair of side walls 83 and 84, and end walls 86 and 87. Circular openings 88 are formed in the end walls to receive the inner ends 89 (FIG. 6) of both tubes 46 and 47. A bottom wall 91 completes the intermediate housing 43. As best illustrated in FIGS. 3 and 6, a semi-circularly curved baffle plate 92 is extended over the upper gear 78 and between the side walls 83 and 84 for deflecting granular material falling through the hopper enclosure 34 away from the gears 78 and 79.

The lower gear 79, in driving mesh with the upper gear 78, is secured to the inner end of the auger 63, which inner end 93 is journaled in a bearing mounting 94 supported on a bracket 96 (FIG. 6). A coupling 97 secured to the inner auger end 93, couples that auger end to the inner end 98 (FIG. 6) of the auger 64. The coupling 97 is such that both augers 63 and 64 may be readily assembled and dis-assembled for assembly and servicing purposes. Furthermore, the bottom wall 91 of the housing 43 can be readily removed from the remainder of the housing to enable servicing of the gear transfer assembly 22.

For operation of the level fill apparatus 10, upon energization of the motor 73, the resulting rotation of the upper bevel gear 78 effects a "walking" of the bevel gear 79 in a circular direction around the upper stationary gear 78 such as to effect a concomitant rotation of both augers 63 and 64 relative to their tubes 46 and 47, while also rotating the discharge unit 19 circularly about the suspension unit 17. As granular material is fed downwardly through the funnel 14 and the hopper enclosure 34 to fall into the intermediate housing 43, rotation of the augers 63 and 64 with their reversed flightings effects a radial and opposite movement of the granular material outwardly through the tubes 46 and 47. Due to the progressive lowering of the discharge openings, an uneven discharge of the granular material along the lengths of the tubes 46 and 47 results, with the amount of grain discharged from each opening progressively increasing from the innermost opening 51 to the outermost opening 59 and to the open end 61 of each tube. Thus, as a result of operation of the motor 73 and the discharge of granular material into the hopper enclosure 34, the surface 99 (FIG. 2) of the granular material filling the grain bin 11 remains level during the entire grain discharge operation.

Although a preferred embodiment of the invention has been described hereinbefore, it is to be remembered that various modifications and alternate constructions may be made thereto without departing from the true spirit and scope of the invention as defined in the appended claims.

I claim:
1. Apparatus for discharging granular material to level fill a grain bin or the like comprising in combination:
  hopper means open at the top and bottom ends thereof;
  support means suspended from the top of the grain bin and rotatably supporting said hopper means;
  an elongated auger tube in communication with said bottom end of said hopper means and attached thereto for receiving material therefrom;
  said auger tube having a plurality of material discharge openings formed therein in longitudinally spaced relation;
  auger means rotatably disposed in said tube;
  said auger tube being in communication with said bottom end of said hopper midway between the ends of said auger tube, and the ends of the tube and the outer ends of said auger means are spaced inwardly an equal distance from the respective adjacent walls of the grain bin and are in non-contacting relation therewith; and,
  power means disposed inside said hopper means and operatively connected to said auger means for rotating same and simultaneously rotating said auger tube about the grain bin.

2. Apparatus for discharging granular material as defined in claim 1, and further wherein said elongated auger tube is disposed substantially horizontally radially in opposite directions from said bottom end, said auger means including an auger with the flighting of the auger extended in one direction from a connection with said power means being reversed from the flighting of the auger extended in the opposite direction from said connection.

3. Apparatus for discharging granular material as defined in claim 2, and further wherein said power means-auger connection is located midway between the opposite ends of said auger tube, and wherein said connection comprises a set of meshed gears mounted within said auger tube, with one of said gears integral therewith for imparting movement to said auger.

References Cited

UNITED STATES PATENTS

| | | | |
|---|---|---|---|
| 565,068 | 8/1896 | Dornfeld | 214—17 |
| 2,961,126 | 11/1960 | Craig | 198—64 X |
| 3,075,657 | 1/1963 | Hazen | 214—17 |
| 3,145,855 | 8/1964 | Plugge et al. | 214—17 |
| 3,248,117 | 4/1966 | Donelson | 214—17 |

GERALD M. FORLENZA, *Primary Examiner.*

ROBERT G. SHERIDAN, *Examiner.*